United States Patent [19]
Warwicker et al.

[11] 3,860,680
[45] Jan. 14, 1975

[54] METHODS OF MAKING MICROPOROUS POLYMER MATERIALS

[75] Inventors: Eric Albert Warwicker; Ronald Hodgkinson, both of Norfolk, England

[73] Assignee: Porvair Limited, Norfolk, England

[22] Filed: May 31, 1972

[21] Appl. No.: 258,381

[30] Foreign Application Priority Data
June 2, 1971 Great Britain.................... 18640/71

[52] U.S. Cl................. 264/41, 117/62.2, 161/190, 161/227, 161/231, 161/247, 161/255, 161/256, 161/265, 161/DIG. 2, 264/49, 264/216, 264/DIG. 57, 264/DIG. 61, 264/DIG. 62, 264/DIG. 77, 264/DIG. 79
[51] Int. Cl... B29d 27/04, B32b 27/00, B32b 27/40
[58] Field of Search........ 210/500; 264/41, 49, 215, 264/216, 217, 218

[56] References Cited
UNITED STATES PATENTS
3,696,180 10/1972 Cunningham........................ 264/41
3,729,536 4/1973 Warwicker.......................... 161/159

FOREIGN PATENTS OR APPLICATIONS
284,725 7/1928 Great Britain..................... 264/218
981,642 1/1965 Great Britain Primary Examiner—Melvyn I. Marquis
Assistant Examiner—Gary R. Marshall
Attorney, Agent, or Firm—Abner Sheffer

[57] ABSTRACT

Process is disclosed for producing water vapour permeable polymer sheets of improved surface smoothness. A coagulable polymer composition is applied to a dried evenly porous belt which then slides over a trough of non solvent which wets the belt so as to prevent the polymer composition passing right through the belt.

19 Claims, 8 Drawing Figures

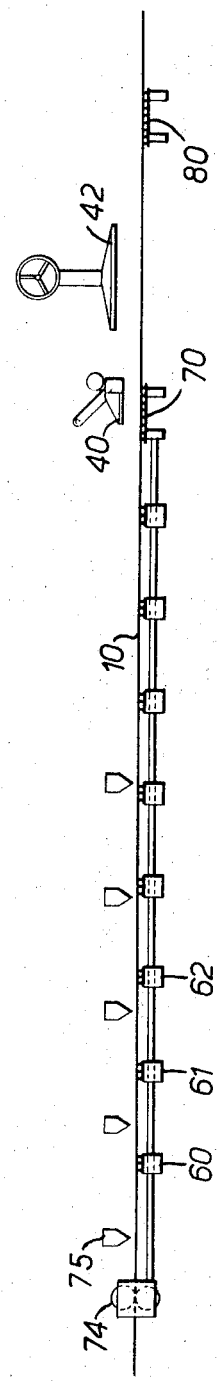
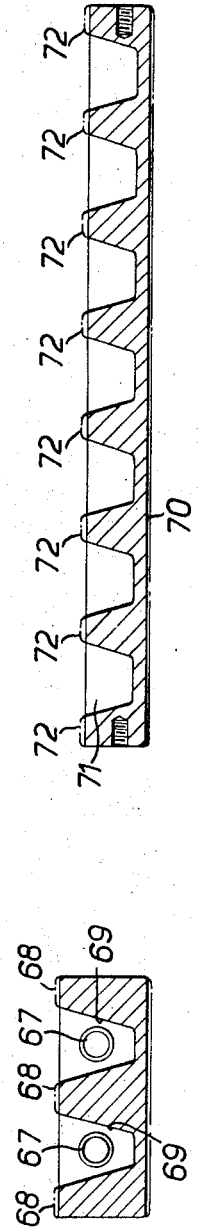

METHODS OF MAKING MICROPOROUS POLYMER MATERIALS

The present invention relates to methods of making microporous polymer sheet materials and to apparatus for carrying out the method.

The invention is concerned with microporous polymer materials which are produced by coagulating layers of polymers extended with liquid vehicles, for example polymer solutions, gels or colloidal dispersions with liquid non solvents. It has been suggested that the non solvent can be applied to the surface of the layer of polymer solution as a vapour, but this is not feasible for relatively thick layers e.g. 0.5 millimetres upwards, or as a spray but this produces an uneven surface. The more usual method is to pass the layer on a support with the support uppermost into a bath of the liquid non solvent.

This presents considerable problems in conveying the material through the bath especially in a continuous process since the polymer layer may require a substantial period of time e.g. of the order of ½ hour before the polymer surface can be conveyed around a roller without a surface blemish being produced.

The applicants have observed that attempting to pass the layer on a porous support such as a woven belt, with the layer uppermost into a bath of liquid non solvent brings a number of problems. Thus air bubbles trapped in the support are liable to produce cavities in the polymer layer, also when a layer of polymer on a support is merely passed straight into a bath of non solvent surface imperfections consisting of small craters are often observed. Experiments by the applicants have indicated that these are largely caused by coagulation occurring unevenly from the support face of the layer and are thought to result from localized mass transfers in the layer occurring due the coagulation process.

The applicants investigations have indicated that major causes of this uneven coagulation are irregularities in the porosity and in the degree of wetting of the support.

Thus the support, if re-used as is desirable, is liable to have small portions of coagulated polymer on its surface blocking some of the spaces between the weft and warp threads. Coagulation directly above such blocked portions tends to proceed less rapidly than where the openings in the support are not blocked. Those parts of the polymer composition which are still uncoagulated being still fluid appear to be drawn away from the blocked area since in tests depressions or craters are observed to occur directly above deliberately blocked areas. It is thought that uneven wetting of the support in tending to produce uneven degrees of coagulation can cause mass transfers and pitting in a similar manner.

An object of the present invention is the provision of a simple process and apparatus whereby these problems are reduced or overcome.

According to the present invention a process for making water vapour permeable polymer sheet material which comprises forming a layer at least 0.5 mms thick of coagulable film forming polymer composition on a porous solid support, the said layer having a free surface and the said porous support having a free surface, bringing said layer of coagulable film forming polymer composition into contact with a liquid non solvent coagulant for the said polymer the said composition and the said coagulant being such that said contact results in coagulation of the said layer to porous water vapour permeable form, and then stripping the coagulated layer from the support, characterized in that the support is arranged to be dry and evenly porous prior to application of the layer of polymer and in that before the polymer has penetrated through the support, and preferably before the layer is brought into contact with the coagulant, non solvent coagulant liquid is evenly applied to free surface of the porous support across the width of the layer, the porosity of the support and the amount and moment of application of the coagulant being such as to prevent the layer of polymer penetrating through the support. The non solvent is preferably applied so as to wet the free surface of the porous support ie to saturate it. However the actual formation of a defineable layer of non solvent is not essential so long as the non solvent requirements of the layer of polymer are met across the width of the layer. Indeed the application of excess non solvent could be disadvantageous since the excess might run into drops and possibly result in uneven coagulation.

It is thus preferred to apply the non solvent by what appears to be a form of wicking or capillary action so that the layer draws its non solvent requirements from being in contact with a reservoir of non solvent. Thus in a sense the rate of application of non solvent to the free surface of the porous support is controlled automatically by the layer of polymer itself.

Thus in a preferred form of the process the non solvent liquid is applied to the support by maintaining a free non solvent surface at a fixed position extending across the width of the layer, maintaining the free surface of the porous support in contact with the non solvent surface and causing continuous relative movement therebetween as by conveying the support past the non solvent surface. Thus the free surface of the said porous support is preferably led past means for supplying liquid non solvent coagulant in wicking relationship thereto and liquid non solvent is supplied to the said means whereby the free surface of the porous support is evenly wetted with the said non solvent.

The means for supplying liquid non solvent may comprise trough means extending across beneath the support and having rounded top edges on which the said free surface of the porous support bears in sliding relationship. The ratio of the width of the trough means in the direction of movement of the porous support to the thickness of the polymer layer is preferably in the range 50/1 to 5/1 and non solvent liquid is fed into the trough so as to cause the non solvent to overflow the trough. The trough means can comprise a pair of troughs placed side by side each trough having a width in the range 50/1 to 5/1 with regard to the thickness of the polymer layer.

The non solvent surface can be conveniently produced and maintained by means of a trough extending across the layer (beneath the support conveyor when the layer is carried uppermost on the conveyor). This trough is fed with non solvent in such a way that the non solvent overflows the edges of the trough which preferably have rounded edges and a flat support surface extending a short distance e.g. 1 or 2 cms away from the edge of the trough. The trough may be surrounded by a further drain trough to lead away the liquid which has overflowed.

Any other means effective to apply sufficient non solvent in an even and controlled manner could be used. However, whilst the non-solvent could be sprayed e.g. by a fine or atomized spray, brushed, roller coated e.g. by a non solvent fed sponge roller, or otherwise evenly applied to the porous support, the arrangement specifically described is considerably simpler and more compact and is preferred.

As mentioned above the non solvent application is carried out to prevent the polymer layer fully penetrating the porous support and controls the degree of penetration and thus the keying between the layer of polymer and the porous support. If the keying is too little the layer is liable to break away from the support due to the high shrinkage forces produced by the coagulation. If the keying is too great the layer is liable to be torn or broken in the attempt to strip it from the support and the porous support may be blocked by fragments of polymer and thus not be reusable.

With a woven belt having about 130 warps per inch and 36 wefts per inch a suitable keying is achieved when the polymer penetrates some 30 to 60% through the thickness of the belt particularly about 40 to 50% as indicated by the depth of the belt pattern impressed in the underside of the coagulated layer when stripped from the belt.

One skilled in the art will be able with this teaching to achieve suitable keying between the layer of polymer and the porous support by applying the non solvent to the underside of the support at the point appropriate to the particular porous support, polymer composition and speed of the process which he desires to use and will be able to determine this point by simple experiment.

The porous support as mentioned above is evenly porous. A woven belt is evenly porous when fully clean in the sense that whilst at a thread its porosity can be considered to be zero and at a hole infinite, this variation is regular and constant throughout the whole area of the belt. However if a hole between two threads becomes blocked the variation in porosity is no longer regular. Materials in which the porosity variation is regular and constant in this way are described as evenly porous.

In order to ensure this even porosity the support is cleaned regularly during use to remove bits and pieces of polymer and other dirt and debris. Conventional belt cleaning techniques involving solvents detergents and chemical cleaning agents compatible with the material of the support can be used.

The porous support is preferably dried by air jets and hot air flows to blow away liquid held between threads by surface tension and evaporate the remainder.

With this teaching appropriate cleaning and drying procedures to suit the particular circumstances involved will be readily apparent to one skilled in the art.

When a layer of polymer such as about 30% polyurethane solution in dimethylformamide containing dispersed microsscopic sodium chloride (eg 1.8 parts sodium chloride to 1 part of polymer) is being used at a wet thickness of 2 to 3 mms with a 130 warp/36 weft mesh support at a belt speed of about 1 foot per minute the non solvent is applied to the free surface of the support about 1 foot to 1.5 feet e.g. 9 inches to 14 inches from the point at which the first polymer layer is applied to the belt. Subsequent layers may be applied on top of the first layer downstream preferably before the first trough but in any case before coagulation of the free surface of the polymer. Further non solvent may be applied to the free surface of the support at any intermediate point between the first trough and the point at which coagulation of the free polymer surface commences.

Once all the layers of polymer desired have been applied to the support the free surface is desirably also coagulated. This could be achieved by merely passing the layer on the support into a body of liquid non solvent or by other coagulation techniques. However these have disadvantages either failing to produce a smooth surfaced product or being complicated or time consuming to achieve.

It is thus preferred to at least initiate coagulation of the free surface of the polymer layer or layers by maintaining them uppermost on the porous support and applying liquid non solvent in continuous form to the said free surface of the polymer layer or layers, as described in British Patent Specification No. 28076/69. The coagulation of the said free surface of the polymer layer is thus preferably initiated by applying said coagulant in continuous form to said free surface by forming a continuous layer of said coagulant liquid extending across the width of the said layer on said surface. The sheet is preferably arranged uppermost on the said porous support. The process preferably comprises passing the said free surface of the said layer through a surface of said liquid non solvent coagulant which surface of coagulant is stabilized against movement.

Thus a preferred process for making a water vapour permeable polymer sheet material comprises forming a layer at least 0.5 mm thick of a polymer composition in adherence with a porous solid support, the said layer having a free surface and the said porous support have a free surface, the polymer composition being polymer extended with liquid vehicle selected from the group consisting of emulsions of polymer in blends of solvent and non solvent, colloidal dispersions of polymer in blends of solvent and non solvent, gels of polymer in blends of solvent and non solvent, solutions of polymer in solvent, and solutions of polymer in blends of solvent and non solvent, the solvent being one selected from the group consisting of N, N'-dimethyl formamide, dimethyl sulphoxide, N-methyl pyrrolidone, dimethyl acetamide, tetrahydrofuran and blends with toluene and methylethylketone and mixtures thereof, the non solvent being one selected from the group consisting of water, glycol monoethyl ether, ethylene glycol, glcyerol, 1,1,1-trimethylol propane, methanol, ethanol, acetone, hexane, octane, benzene, petroleum naptha, toluene, tetrachloroethylene and chloroform, and the polymer being one selected from the group consisting of polyvinylchloride, vinyl chloride copolymers, acrylonitrile, acrylonitrile copolymers, polyurethanes, copolymers of butadiene and acrylonitrile, polyacetals, polyamides, polyesteramides, polyvinylidene chloride, polymers of alkyl esters of acrylic and methacrylic acids, chlorosulphonated polyethylene, cellulose esters and ethers, polystyrene and blends thereof, the support being arranged to be dry and evenly porous prior to application of the layer of polymer and in that before the polymer has penetrated through the support, and before the layer is brought into contact with the coagulant, non solvent coagulant liquid is evenly applied to the free surface of the porous support across the width of the layer, the porosity of the support and the amount and moment of application of the coagulant being such as to prevent the layer of polymer penetrating through the support, and thereafter causing continuous relative movement of the said layer in adherence with the support with respect to a body of non solvent coagulating liquid, selected from the group consisting of water, glycol monoethyl ether, ethylene glycol, glycerol, 1,1,1-trimethylol propane, methanol, ethanol, acetone, hexane, octane, benzene, petroleum naptha, toluene, tetrachloroethylene, and chloroform the free surface of the said layer coming into contact with the said body of coagulating liquid along a line of contact bounding an exposed surface of the said body of liquid, the said liquid surface being stabilized along a line spaced from the said free surface of the said layer by not more than 1 centimeter and preferably in the range of 0.1 to 8 millimetres especially 2 to 7 millimetres whereby at least the said free surface of the layer is coagulated to water vapour permeable form of improved surface smoothness. Preferably the speed of the said free surface of the polymer layer with respect to the said line of contact with the said body of coagulating liquid is less than 15 feet per minute, and the said layer of polymer is maintained on the support until the layer is coagulated to self supporting form.

Preferably the said liquid surface is stablized by the presence of a solid boundary located along the said spaced line. Desirably the distance between this said boundary and the free surface of the layer is such as to enable a meniscus of non solvent liquid to form therebetween.

The distance between the solid boundary and the free surface of the said layer is desirably maintained substantially constant during the relative movement which conveniently consists of the sheet being moved past the body of liquid.

Reference has been made to the relative movement being 'continuous'. The use of this term is not intended to means that the movement persists indefinitely but merely is carried out for substantial periods of time e.g. numbers of hours or days rather than minutes and more importantly that it is not intermittent and is of substantially constant speed during a given period of operation of the process. Clearly, however, the speed can vary from run to run depending on the revelant factors involved in the particular run.

The continuous layer or meniscus of liquid non solvent can be formed by a variety of means though that utilizing a close spaced plate and the surface tension of the non solvent as described in British Patent Specification No. 28076/69 is preferred.

In the preferred form of the invention the body of liquid can be considered as a layer located between the plate and the sheet. However, the exact length of this layer of non-solvent in the direction of relative movement of the sheet and the means forming the layer of non-solvent, the machine direction can vary though in the preferred embodiment this first layer is some 15 to 30 cms (6 to 12 inches) long.

Further non solvent is preferably applied to the free surface of the support at the same or about the same time as the non solvent is applied to the free surface of the polymer layer, conveniently by the same trough means.

The initial trough arrangement mentioned above preferably comprises two troughs side by side about 1 cm apart extending across the belt. This later trough arrangement below the meniscus plate preferably has a larger number of parallel troughs e.g. seven preferably again about 1 cm apart. Each of the troughs is about 3 cms wide in the machine direction the former arrangement preferably has slightly wider troughs.

This further non solvent is preferably applied to the free surface of the support during its travel from the point at which the first layer of polymer is applied to it to the point at which the coagulation of the free surface of the polymer layer is initiated.

This is preferably carried out by leading the support in wicking relationship past further spaced apart bodies of non solvent. These may be the trough and weir arrangement mentioned above. The spacing is such as to ensure that the non solvent requirements are fully met across the support but are not exceeded to the extent that drips of non solvent form at the free surface of the support.

At rates of movement of the support of about 1 – 5 feet per minute the troughs are preferably spaced 1 to 3 feet preferably about 2 feet apart for about the first 20 to 30 feet.

The layer of coagulable polymer composition is preferably applied to the support by suitable spreading means, e.g. through an extrusion die just above the moving support. Extra spreading means may be located as desired between the initial spreading means and the meniscus trough.

A second longer meniscus plate downstream of the first can also be provided and a second meniscus trough similar or identical to the first can also be provided preferably downstream of the second meniscus plate. The continuous layer of non solvent used to initiate coagulation of the free surface of the polymer layer is desirably thin, and it is preferred that the coagulation is completed by maintaining a substantially continuous and again desirably thin layer of non solvent on at least the free surface and preferably both surfaces of the layer of polymer.

The thickness of the layer of non solvent is not thought to be critical and can be as thin as desired in order, for example to reduce the volume of liquid from which the solvent will have to be recovered provided that it is adequate to meet the sheet's requirements to achieve even coagulation as rapidly as possible.

Thus the layer does not need to be thicker than 1 centimetre thick and is preferably 1 millimetre thick and can be as thin as 0.1 millimetre though at this thickness it may become difficult to maintain the layer in substantially continuous form. A useful and readily acheived thickness for the non solvent layer is in the range 1 to 5 millimetres particularly when water containing up to 10% w/w of dimethylformamide is used as the non solvent. A wetting agent may usefully be added to the non solvent to assist in the maintenance of the layer of non solvent.

The application of non solvent to the porous support is carried out prior to the initiation of the coagulation of the free surface of the sheet as mentioned above. However, these steps are desirably both started within the first quarter or half of the period required to substantially completely coagulate the polymer. With the preferred unreinforced polymer layers this period is the time required for the layer to become capable of being stripped from the support without rupturing or delaminating.

Desirably the two steps occur within a short space of time relative to the total time needed for coagulation to a state at which the layer can be stripped from the support e.g. the time between the two steps using between 1/10th, 1/15th or 1/20th or more of the total time for coagulation. In the systems specifically described hereinafter the coagulation takes about 35 minutes from the time that the layer of non solvent is applied to the free surface of the layer of polymer, and the free surface of the porous support is wetted about ½ to 4 minutes prior to this.

The evenly porous support may be made of any material which is sufficiently flexible to run through the process and has sufficient solvent and temperature resistance to withstand the process conditions and also is such that the polymer layer adheres to its surface at least sufficiently to produce a flat layer on the surface of the support.

The support preferably comprises woven flexible polymer or metal sheet materials such as wire gauze. The textile materials are preferably made from polyester fibres though any other solvent resistant fibre could be used.

When woven supports having a regular array of holes are used the support preferably has the following characteristics. The support preferably has a support area (as herein defined) in excess of 50% preferably 60% and especially 70 to 95% and at least 500 passages per square inch, preferably 1000 and especially 5000 to 10,000 providing communication from face to face of the support.

Support area is defined as the % of the total area of the surface of the support which is occupied by the material of the support and is within 0.5 millimetres of the surface. With woven fabrics there may be primary and secondary support areas and the sum of these is the support area as defined herein. Primary support is the area provided by the warp threads (and possibly also weft in a plain weave) at the highest points in the surface and is the % of the total area provided by such threads above a plane passing through their mid points at the highest points in the surface. Secondary support is the % of the total area less the primary support provided by all threads above a plane passing through the mid points of the weft threads at their point of nearest approach to the surface.

Thus in general terms primary support except in plain weaves is provided by the warp threads and secondary support by the weft threads. In plain weaves weft and warp both contribute and there is no secondary support.

It has been mentioned above that the preferred means for coagulating the free surface of the polymer layer comprises a plate. This plate is positioned in close-spaced relationship to the free surface of the sheet so as to form a slot therebetween and means for supplying non-solvent so as to keep the slot filled. The thickness of the slot is desirably such that when non-solvent is supplied to the downstream end of the plate the surface tension of the liquid establishes a meniscus, adjacent to the upstream end of the plate, between the plate and the free surface of the sheet on the support.

The coagulating means preferably comprise a strip or plate arranged transverse to the direction of travel of the support and adjustably spaced from the surface of the support so that a slot can be produced such as to enable a meniscus to be set up in the gap between the strip or plate and the surface of the polymer layer remote from the support. The porous support may be itself supported beneath the plate by a further trough arrangement. The non solvent supply means preferably comprise porous tubes extending across the width of the plate. These are preferably placed above the downstream end of the plate.

They are conveniently made of the sintered high density polyethylene VYON (Trade Mark) material described above. The production of this type of material is described in British Patent Specifications Nos. 750,239 and 953,359 the disclosures of which are incorporated herein by reference. Alternatively perforated pipes can be used.

The VYON material has the advantage of filtering the nonsolvent supply and providing an even feed and are cheap and can thus be easily replaced.

As mentioned above in a preferred form of this aspect of the invention the thin layer of non solvent is maintained on the surface of the layer of polymer on the support until the said layer of polymer is substantially completely coagulated to self-supporting form.

This can be achieved by arranging the support to run over an elongated tray with spaced plates or sheets arranged over the support and a non solvent supply arranged to maintain the said thin layer of non solvent in the gap between the said plates or sheets and the said surface of the polymer layer. The sheets may be freely floating on the layer of non solvent and may be merely secured at their upstream end.

The non solvent maybe provided at a number of stations spaced down the tray with drain slots across the tray prior to the next inlet station. The arrangement can then run on a countercurrent basis by feeding the outflow from each stage to the inlet of the preceding upstream stage. This arrangement enables a controlled concentration gradient of solvent and non solvent to be set up, and controlled at any desired level.

This enables the procedures disclosed in British Patent Specification No. 981,642 to be readily carried out. However, whilst these may be desirable for certain systems of polymer extended with liquid vehicle as disclosed in that document they are not essential to the satisfactory coagulation of the pastes (comprising polymer, removable filler and solvent) preferred for use in the present invention.

The plate may be at a slight angle to the horizontal so that the support passes downwardly beneath the plate the angle being such that the meniscus can be established merely by supplying non solvent on to the polymer surface adjacent to the downstream edge of the plate.

Preferably means are provided to maintain the free surface of the said sheet at least wetted with non solvent until the polymer is substantially completely coagulated.

These means may comprise at least one covering sheet positioned above the polymemr layer downstream of the plate so as to establish and maintain a thin film of non solvent evenly over the surface of the polymer layer.

Alternatively since the polymer surface is coagulated relatively rapidly e.g. with a 2 mm thick film of the system described below within 1 or 2 minutes i.e. at 1½ to 2 feet per minute process speed within 1½ to 4 feet or so at any stage after this smooth edged plates e.g. rounded edge glass plates, may be arranged transverse to the layer in sliding relationship with the free surface of the coagulated layer to form in effect a series of dams. If the belt is arranged to slope down at a slight angle these plates can be used to maintain layers of non solvent of gradually increasing thickness over the coagulating layer of polymer.

Thus the method and means by which the layer of non solvent is maintained can be varied. Thus fine sprays or mists could be used to keep the surface wet but care would have to be taken to ensure that the wetting was even across the width of the layer and its length until it was coagulated.

Whilst the process and apparatus is particularly suited to the production of unreinforced microporous polymer layers its advantages will also be obtained in the production of reinforced layers. Thus when a "sheet of polymer extended with liquid vehicle" or "polymer extended with liquid vehicle in sheet form" is referred to both unreinforced and reinforced polymer compositions are included within the term unless otherwise stated. Thus the invention is applicable to the coagulation of polymer extended with liquid vehicle not only when the polymer composition exists as a single homogeneneous layer but also when it exists as a number of superposed layers of varying compositions for example varying in polymer, pigment, stabilizer, filler or other component nature or content.

However, the present invention finds a particular application in the production of relatively thick polymer layers free from preformed fibrous sheet reinforcement for example from 0.5 millimetres up to as thick as 5 millimetres or more and especially to the production of layers having a thickness making them suitable for use as shoe upper materials for example 0.8 millimetres to 2.5 millimetres preferably 0.8 to 1.1 millimetres for women's weight shoes and 1.1 to 2.5 millimetres preferably 1.5 to 1.8 millimetres for men's weight shoes.

Such materials can be produced in vapour permeable or microporous form from a layer on a support of solutions of polymers for example polyurethanes, in organic hygroscopic or or hydrophilic solvents, for example N,N dimethylformamide, the said solutions desirably containing microscopic water soluble particles eg having particle sizes in the range 1 - 100 eg 20 - 50 microns for example inorganic salts or organic salts eg sodium chloride, by coagulation with liquid non solvents for example water or water solvent blends. However, the invention is applicable to any polymer compositions coagulable to the form of a selfsupporting film or sheet.

It should be emphasised that the invention also extends to apparatus for carrying out the process in accordance with the invention thus apparatus for making water vapour permeable polymer sheet material comprises a porous support in the form of an endless belt, first means suitable for forming a layer of coagulable polymer composition on the said porous support, the said layer having a free surface and the said porous support having a free surface, cleaning and drying means suitable for ensuring that the belt immediately prior to formation of the said layer is clean and dry, second means suitable for evenly applying non solvent liquid coagulant evenly to the free surface of the support across the width thereof positioned relative to the said first means so that, when the said second means is supplied with non solvent the polymer composition is prevented from penetrating through the support to the said free surface thereof and drive means arranged to drive the belt first past the cleaning and drying means then past the first means and then past the second means.

There can also be provided at least one third means suitable for forming a further layer of coagulable polymer composition on the free surface of the first said layer and at least one additional fourth means suitable for applying non solvent to the free surface of the porous support may be provided for each such additional means for forming a further layer of polymer composition.

Preferably there is also provided fifth means suitable for forming a continuous layer of non solvent coagulant liquid extending across the width of the layer of polymer on the free surface of the said layer of polymer.

The fifth means can comprise a plate positioned in close spaced relationship to the free surface of the layer of polymer so as to form a slot therebetween and means for supplying non solvent so as to keep the slot filled. Preferably the thickness of the slot is such that when non solvent is supplied to the downstream end of the plate the surface tension of the liquid establishes a meniscus adjacent to the upstream end of the plate between the plate and the free surface of the layer of polymer on the support.

The invention may be put into practice in various ways and three specific embodiments will be described by way of example with reference to the accompanying drawings in which:

FIG. 2 is a diagrammatic side elevation of part of a modified version of the plant shown in FIG. 1 the parts shown being the extrusion and coagulation parts, FIG. 3 is a side cross sectional elevation of a keying trough shown in FIG. 2 and FIG. 4 is a side cross sectional elevation of a meniscus trough shown in FIG. 2, on the same scale as FIG. 3.

Figure 1:
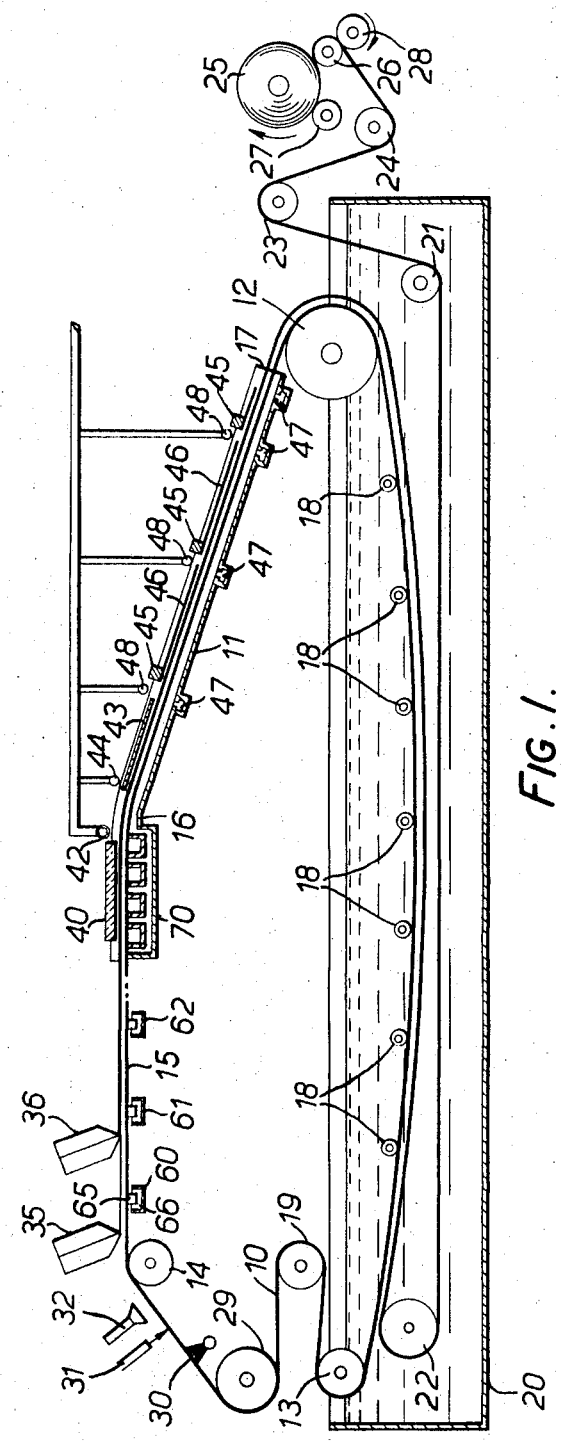
FIG. 1 is a diagrammatic side elevation of one form of plant embodying a simple form of the invention.

THE APPARATUS SHOWN IN FIG. 1.

This consists of an endless conveyor belt 10 of woven polyester fabric passing around three rollers 12, 13 and 14 and over an inclined tray 11 (the slope of which is highly exaggerated). The tray 11 is arranged beneath the upper part of the conveyor and supports it for a substantial part of its length. The upper end 16 of the tray is on the same level as the top of the uppermost 14 of the three rollers thus providing a horizontal upper stretch 15 of conveyor belt. The lower end 17 of the tray terminates just before the lower roller 12 and an end roller 13 is located at the same level as the roller 12 so that the lower part of the conveyor belt hangs in a catenary and is held from floating by bowed rods. The rollers 12, 13 and 14 are arranged to drive the conveyor belt down the tray 11 around the end roller 12 along to and around the roller 13 around further adjustable rollers 19 and 29 and around the roller 14 and thence back to the top 16 of the tray 11. The rollers 19 and 29 facilitate tensioning of the belt. The lower part of the conveyor belt is arranged to be within a tank 20 so that when liquid is placed in the tank the lower catenary portion of the conveyor belt 10 will be beneath the surface of liquid. The tank 20 also contains rollers 21 and 22 located below the rollers 12 and 13 in the tank. A guide roller 23 and a dancing roller 24 are located outside the tank 20 together with a rewind reel 25 supported on rollers 26 and 27, roller 26 being driven by a further roller 28. Belt drying apparatus is located between the roller 29 and 14. As shown diagrammatically in FIG. 1 this consists of a brush 30 an air blast 31 and radiant heaters 32. These are operated continuously so that the belt is fully dried by them before passing to the extrusion head 35. Any assembly of air jets and heaters or other suitable drying means effective to fully dry the belt can be used.

Prior to the belt drying apparatus there is desirably a belt cleaning assembly (not shown). Any suitable arrangement can be used. However we have found that an assembly comprising a 10% phosphoric acid in water spray, followed by an air blast, a rotating brush, and a water spray rinse is effective. The cleaning assembly may be operated continuously or intermittently as necessary. All that is required is that the cleaning process should be effective to keep the belt fully clean and free of debris on each pass so that none of the belt interstices become blocked to such an extent as to result in uneven coagulation and surface blemishes.

A pair of extrusion heads 35 and 36 are located at the upper portion 15 of the conveyor 10 so as to be adapted to lay down superimposed layers of polymer paste on the conveyor belt. At the top end of the tray 11 a meniscus plate 40 is supported adjustably parallel to the tray 11 so as to provide a slot of adjustable thickness but of substantially greater dimension in the direction of motion of the conveyor than its thickness. The meniscus plate extends across the full width of the conveyor. Immediately downstream of the meniscus plate in the direction of motion of the conveyor there is arranged a Vyon tube 42 to feed liquid on to the surface of the meniscus plate 40 at its downstream edge.

Immediately downstream of this Vyon tube there is a further glass plate 43 about 8 feet long provided with a Vyon feed tube 44 adjacent its upstream edge. Cross bars and trailing sheets 46 about 6 feet long are spaced down the rest of the tray and extend across the tray. Below the end of each sheet 46 the tray has a transverse drain slot 47. Immediately prior to each bar 45 but downstream of the preceding drain slot there is located an inlet pipe 48. The drained liquid may either be discarded from the slots 47 or fed back to the preceding inlet 48 acting in effect as a counter current. These trailing sheets maintain a thin layer of non solvent down the full length of the tray and across its width.

Preferably pure water is fed in at the end of the tank 20 adjacent the roller 13 and the liquid fed in counter current from the end of the tank adjacent the roller 12 to the lower end of the tray 11. The water fed into the tank is preferably at 40°C to 80°C and at the other end of the tank its temperature is about 30°C and its N,N'-dimethylformamide content about 3% by weight. The outflow from the tank is fed to the tray 11 in counter current and the final outflow 47 from the tray 11 is arranged to contain up to about 10% of dimethylformamide which is recovered in a solvent recovery plant. The outflow could easily be arranged to have a higher solvent content but it has been observed that as the solvent content increases in the initial coagulating liquid the coagulated surface tends to be less smooth and can take on a matt appearance.

Measuring means (not shown) may be located between the roller 14 and the extrusion head 35, between the two extrusion heads 35 and 36 and between the extrusion head 36 and the plate 40 so as to enable control of the thickness of the extruded materials to be achieved. This can be done by measuring either the thickness or the weight of the material passing the measuring means.

A series of keying troughs 60, 61, 62 spaced about 2 feet apart are located beneath the horizontal upper portion 15 of the conveyor belt.

The first trough 60 is about 18 inches down stream of the first extrusion head 35.

These keying troughs as their name implies are used to control the degree of penetration of the polymer composition fed from the dies 35 and 36 into the belt 10. Each trough is fed with water or other non solvent being used so as to wet but not soak the belt. Each trough has an inner trough 65 and an outer drain 66. The non solvent is fed to the weir 65 and any excess flows over the surface 68 and into the drain 66.

The top surfaces 68 of the troughs are rounded as shown in FIG. 3 and have individual inlet ports 67. The troughs are provided by a pair of flat bottomed troughs 69 which diverge outwardly and extend across the full width of the belt. The belt slides across the top surfaces 68 of the troughs.

A larger trough 70 (a preferred form of which is shown in detail in FIG. 4) is located beneath the belt beneath the plate 40 and overflows into the tray 11. As shown in FIG. 4 the trough 70 has seven flat bottomed diverging troughs 71 (each provided with an inlet port (not shown)) and again having rounded top edges 72 on which the belt 10 slides. The troughs 71 however are wider than the troughs 69 in the direction of travel of the belt though once more they extend the full width of the belt.

The equipment described above can be used to produce a water vapour permeable self supporting sheet material as follows:

The conveyor belt 10 is set running at the desired speed e.g. 1 to 5 or 10 preferably 3 to 5 feet per minute, the tank 20 is filled with liquid, for example water, sprays 42 are supplied with liquid for example water. The take-up drive roller 28 is synchronized with the speed of the belt 10, the drying apparatus is started and when the belt is dry the polymer composition which it is wished to coagulate is fed to one or both of the extrusion heads 35 and 36 depending on whether a single layer film or a double layer film is to be produced.

The rate of feed of polymer to the heads is adjusted to give the desired thickness or thicknesses, for example in the range 0.3 millimetres to 3.0 millimetres. The first layer of polymer composition applied to the dried belt sinks into and penetrates the belt at a rate depending on the belt characteristics and the viscosity of the polymer composition. When the belt slides over the keying trough 60 the non solvent fed to the trough wicks up into the belt and starts coagulation of the layer of polymer in the belt arresting further penetration of the belt. The degree of penetration of the belt is preferably in the range 30 to 70% e.g. 50 to 60% of its thickness which typically is in the range 0.3 to 1.0 mms e.g. 0.5 to 0.8 mms i.e. the layer of polymer typically penetrates some 0.15 to 0.6 mms e.g. 0.2 to 0.4 mms since with these ranges at least using the preferred polyurethane DMF sodium chloride compositions described below a good balance is struck between adequate adhesion to the belt and ready stripping from the belt after coagulation. If the penetration is insufficient the shrinkage forces occuring during coagulation may cause the coagulating layer to peel away from the belt and cockle up and snag in the plant. If the penetration is excessive either the polymer may be drawn like a fibre spinning process through the belt or the adhesion may be such that the material ruptures on being stripped from the belt, possibly damaging or blocking the belt as well as ruining the material.

Achievement of a suitable degree of penetration can be achieved by adjustment of the belt speed the position of the keying trough 60 and the rate of non solvent feed and with the teaching herein one skilled in the art will be able to adjust these parameters to suit his particular polymer composition and belt by means of simple experiments.

We have found that a suitable belt is one having 60 mesh i.e. 60 holes to the inch plain weave polyester fibre weft with a straight stainless steel warp thread to provide transverse stiffness with this belt which is about 0.5 mms thick a typical satisfactory penetration is some 0.3 mms or just above i.e. about 50% penetration of the belt.

The feed of non solvent to the trough 60 should not be excessive i.e. the belt should have an evenly damped underside with no dry patches and no drips since both of these will cause or be symptomatic of uneven coagulation. The remaining troughs 61 and 62 are arranged to maintain the belt in this fully damped condition so that the requirements of the polymer layer for coagulant are satisfied but not exceeded.

The film carried on the conveyor belt 10 and adhering to it to a controlled extent due to the keying troughs passes between the plate 40 and the tray 11. The separation of the plate 40 from the top surface of the extruded film is adjusted to be such that a stable meniscus of liquid is established at the upper end of the plate 40. The film on the conveyor thus first comes into contact with the coagulating liquid in a stabilized state and the surface is evenly coagulated. With water, even coagulation is produced when this meniscus is of ¼″ and preferably 1/16th inch or below in thickness. As the coagulation liquid is absorbed into the film further fresh liquid passes up beneath the plate 40 to replenish the meniscus. The film surface is thus rapidly coagulated and coagulation of the rest of the layer or layers is continued as the conveyor passes beneath the sprays 42 and then under the further stabilised film of coagulating liquid provided by the polyethylene sheets 46.

These sheets minimise the production of surface irregularities which are observed to occur when it is not used and the sprayed liquid is merely allowed to run down the surface of the conveyor under gravity. The least partially coagulated film then passes round the roller 12 and beneath the surface of the liquid in the tank 20. It will be appreciated that the conveyor belt is now uppermost and the film is underneath it. At the rate mentioned above for the conveyor and with the dunk tank 20 being 50 feet long the film takes 35 minutes to pass from the roller 12 to the proximity of the roller 22. Within this time sufficient solvent has been displaced from the film for the polymer to be in a self supporting condition. The leading edge of the film can thus be detached from the conveyor and led round the roller 22 and back through the tank for a further period of 35 minutes during which a substantial proportion, if not all, of the solvent is displaced, depending on the thickness of the layer or layers. The film is then led around the roller 21 out of the tank 20 over the roller 23 under the dancing roller 24 which controls the tension in the self-supporting layer between the rollers 26 and 27 and then on to the reel 25 in a clockwise direction under zero tension. The factors of film thickness, the nature of the solvent and coagulating liquid, the conveyor belt speed, the temperature of the liquid in the tank 20 and the length of the tank 20 should preferably be selected to ensure that substantially all of the solvent is displaced from the polymer film but if outside factors make it desirable the process may be run so that some solvent remains and this can easily be removed in a further treatment of the self supporting sheet material with a solvent miscible non solvent for the polymer which may be the same as or different to the coagulating liquid.

FIG. 2 shows a modified arrangement of the extrusion and coagulating parts of FIG. 1. The keying troughs and meniscus troughs are as in FIGS. 3 and 4. Instead of two extrusion heads, five are provided to give production flexibility enabling the formulation being extruded to be changed more rapidly and if desired more than two layers laid down at once. The belt also passes between a pair of steadying rolls 74 before coming to the first extrusion die 75. In addition the secondary glass plate 43 (not shown in this FIG. 2) is removed some distance upstream of the tray 11 and a secondary meniscus trough 80 is located some 5½ feet downstream of the first meniscus trough 70.

The apparatus also comprises a reactor vessel for preparing polyurethane in solution and pipework, storage tanks, pumps and mixing apparatus for distributing microscopic salt particles, stabilizers and other processing aids evenly through the polymer solution to produce one or more pastes and then delivering the pastes to the extrusion dies.

The actual mixture fed to the extrusion heads could vary within wide limits but the apparatus is particularly suitable for use in conjunction with the formulations disclosed in British Patent Specification No. 1,122,804 and British Patent Specification No. 1217341.

Preferred formulations for use in the apparatus are as follows. A polyurethane is formed in solution in dimethylformamide from a polyester by reaction with a diol and diisocyanate under an inert atmosphere as described in more detail below. The polyurethane solution containing approximately 30% by weight of resin solids is mixed with microscopic sodium chloride particles (particle size 10 – 20 microns as measured by Sedimentometry) in an amount of about 2 (eg 1.8 or in the range 1.0 to 2.5) parts by weight per part by weight of resin and with small amounts of stabilizers and pigment. This substrate paste is evenly mixed and deaired and fed to the die 35 to produce a layer of about 0.070 inches (1.8 mm) wet thickness on the belt 10. A top coat paste is formed in similar manner but contains 3 (eg in the range 2.5 to 5 or 6) parts of sodium chloride per part of resin and is based on a 25% resin solution and is fed to the die 36 to produce a layer of about 0.030 inches (0.76 mm) wet thickness on top of the substrate layer. Clearly these thicknesses can be varied as desired.

The polyurethane is preferably made as follows:

880 parts of pure N,N-dimethylformamide were placed in a 1500 part reactor flushed with dry nitrogen. 0.027 parts of paratoluene sulphonic acid and 0.020 parts of dibutyltin dilaurate were dissolved in the dimethylformamide. 205.0 parts of Desmophen 2001 polyester (a hydroxyl terminated polyester of 2000 molecular weight, having a hydroxyl number of about 55.5 mg KOH per g made from about 1 mol butanediol -1,4, 1.13 mol ethylene glycol and 2 mols adipic acid), and 48 parts of butane diol -1, 4 were then added and dissolved in the mixture and the temperature of the mixture adjusted to 25°C.

171.6 parts of 4,4-diphenylmethanediisocyanate were then added bit by bit care being taken to keep the temperature from rising above 50°C. Once the addition was complete the mixture was heated to 60°C and maintained at that temperature for 1½ hours with stirring. The excess unreacted isocyanate content was then determined by titration of an aliquot. Sufficient butane diol (3.0 parts) was then added to react essentially stoichiometrically with the unreacted isocyanate. The mixture was then maintained at 60°C with stirring and the viscosity measured periodically until it had risen to a value of 3500 poise (Brookfield 5 or 6 spindle) as corrected to 24°C. 4.10 parts of butane-diol-1,4 were then added as capping agent to terminate the reaction dissolved in 3.5 parts of N,N-dimethylformamide. The resultant solution had a polyurethane solids content of 32.5%.

The entire disclosure of British patent specification No. 28076/69 is incorporated herein by reference. This discusses in more detail the nature of the microscopic inorganic salt, the nature of the polymer formulation, the nature of the polymer, the nature of the removable filler, and the nature of the solvent for the polymer.

The microscopic inorganic salt e.g. sodium chloride was ground in a pin and disc mill with air classification to seperate out fines and return oversize particles for regrinding. The sodium chloride powder before dispersing in the polymer solution typically had an average particle size of the order of 10 to 20 microns usually about 13 to 17 microns with a standard deviation of the order of ± 10 microns. This measurement was made by sedimentation measurements using a Photoextinction sedimentometer manufactured by Evans Electro Selenium Ltd., Model No. 41 used in accordance with the manufacturers instructions based on papers by H. E. Rose in Engineering of Mar. 31st and Apr. 14th 1950 and Nature of 1952, Volume 169, page 287.

This apparatus consists of a chamber in which the solid whose particle size is to be measured can be dispersed ultrasonically in a liquid and its rate of settling measured optically. The change in transmission of light by the dispersion with time is related to the particle sizes of the particles and the measurements of this change enable the average particle size to be calculated.

It will be appreciated that these sedimentometer experiments give an indication of the general order of particle size of the majority of the particles.

Shadow photography of typical samples of the ground salt has indicated that the salt particles have random rough irregular shapes including quite elongated shapes as well as more compact cube or block shapes.

The dispersions typically contain a few particles having a maximum dimension as large as 70 microns but substantially all of the particles are less than 40 to 50 microns, and most are less than 25 to 30 microns in maximum dimension and have dimensions in the range down to 1 micron or so though a few may be even smaller. The salt is also selected to have a low moisture content so that it does not cake, for example less than 0.5% and especially in the range 0.2 – 0.4%. It may also have an anticaking agent added namely MICROCAL at about 1% by weight. MICROCAL is a very fine particle size coprecipitated lime and silicate anticaking agent sold by Joseph Crosfield & Sons Ltd. The mixing and milling conditions are preferably carried out at relative humidities less than 70% at 25°C and preferably at about 50%.

After stripping from the belt the surfaces of the microporous polyurethane sheet can be finished in the manner described in British Patent Specification No. 28076/69, or in any other desired manner.

The polymer is preferably dissolved in solvent but the term polymer extended with liquid vehicle is intended to cover systems in which the polymer is in emulsion, colloidal or gel conditions as well as those in which it can reasonably be described as being in solution. Such colloidal or gel conditions are conveniently achieved by addition of non solvent to a polymer solution. Examples of this method are disclosed in British Patent Specifications Nos. 914,711, 946,069 equivalent to U.S. Pat. No. 3100721 and 984,088 equivalent to U.S. Pat. Nos. 3190765 and 3190766. However, any method, such as addition of an electrolyte, as disclosed in British Patent Specification No. 1,126,060 which reduces the solubility of the polymer in the solvent can be used to achieve a colloidal or gel condition.

The disclosure of these seven specifications are incorporated herein by reference.

The non solvent is preferably removed, as by drying, subsequent to the removal of the solvent, it merely being necessary that, whilst any solvent remains such as could cause disadvantageous reduction in permeability sufficient non solvent remains to prevent this happening for example by using a non solvent with a higher boiling point than the solvent.

If the viscosity of the system is insufficient to enable sufficiently thick coatings to be formed it can be increased by cooling the mixture or adding thickening agents or by other conventional means.

A high vapour permeability was mentioned above as being desirable in shoe uppers for certain uses. Whilst a degree of porosity can occur when a layer of a polymer solution is bathed with a non solvent for the polymer miscible with the solvent, the pores formed whilst imparting some vapour permeability are liable to be not predictably or evenly distributed and may vary widely in size depending on a wide range of parameters.

An even fine pore size can be ensured by distributing evenly through the polymer solution finely divided particles of a removable filler, for example a solid powder of an inorganic salt, which remain solid in the polymer solution or are arranged to be in a finely divided solid state whilst the polymer is coagulated and are removed at that time or thereafter for example by a leaching agent.

Preferably the ratio in parts by weight of removable filler to working material (polymer) in the initial mixture is in the range 1.5 to 1 up to 3.0 to 1 preferably about 1.7 to 1 up to 2 to 1 and the ratio in parts by weight of working material to solvent in the initial mixture is in the range 20:80 to 40:60, for example 25:75 to 35:65. Preferably the filler is ground so that more than 50% of the particles have diameters in the range 4 to 20 microns.

It will be appreciated that the variation of the parameters of polymer concentration and removable filler concentration for a given polymer concentration, i.e. filler to polymer ratio will affect the properties of the article, an increase in filler to polymer ratio and a decrease in polymer concentration tending to produce a more open i.e. more permeable structure. A balance can conveniently be struck between these trends as discussed in British Patent Specification Nos. 1217342 and 1217341, the disclosures of which are incorporated herein by reference.

Thus, if it is wished to produce a strong essentially microsporous material with essentially no macropores visible to the unaided eye, for example using a thermoplastic essentially linear polyurethane derived from a polyester by reaction with a diol and a slight excess of diisocyanate dissolved in dimethylformamide and using sodium chloride as the removable filler and water as the leaching agent, then the polymer concentration in the solution is desirably in the range 25 to 35% w/w, especially about 30% w/w and the filler to working material is preferably in the range 1.5 to 1 to 2.0 to 1 in parts by weight.

If it is wished to produce a more open and plump material having a substantial number of macropores which result in softer more resilient material then using the same system the filler polymer ratio is selected to be about 0.5 to 1.

It will be appreciated that the leaching agent for the filler does not need to be the same as that for the solvent, thus for example when the solvent is dimethylformamide, it could be removed by methanol and the filler for example sodium chloride could be removed with water.

The polymer can be any organic resin material which is capable of forming a film or coagulation from an emulsion, a colloidal dispersion, a gel or a solution, whether the film is water vapour permeable or not.

The polymer must also be capable of undergoing the various processes specified in the methods described below. However, when the product is intended for use as a man-made leather-like material an elastomeric polymer is preferably used. The particular strength and wear characteristics required for the end use of the man-made leather-like material will determine the particular polymer to be used.

For shoe uppers high abrasion resistance and tear strength combined with a reasonable extensibility and initial modulus to provide proper wear comfort on the foot are required.

Many thermoplastic polymers can be used, for such purposes for example polyvinylchloride and its copolymers, acrylonitrile polymers and copolymers and polyurethanes or blends of one or more of these.

The elastomeric polyurethane may be used on its own or as blends with minor proportions say up to 49% preferably less than 20% of polyvinyl chloride and other polymers and copolymers such as nitrile rubbers including solid copolymers of butadiene and acrylonitrile.

Other polymers which have been suggested for use in man-made leather-like materials include polyacetal resins, (e.g. polyoxymethylene, having for instance, acetate or methoxy end caps) vinyl halide (e.g. vinyl chloride polymers) (including copolymers with other ethylenically unsaturated monomers), polyamides (e.g. nylon 6 or nylon 66), polyesteramides, polyesters (e.g. polyethylene terepathalate or polybutylene terephalate) polyvinyl butyral, polyalphamethylstyrene, polyvinylidene chloride, polymers of alkyl (e.g. methyl or ethyl) esters or acrylic and methacrylic acids, chlorosulphonated polyethylene, rubbery diolefin polymers such as copolymers of butadiene and acrylonitrile, cellulose esters (e.g. cellulose acetate or butyrate) and ethers(e.g. ethyl cellulose) polystyrene and other polymers made from monomers containing vinyl groups.

The preferred polymers however are elastomeric polyurethanes having recovery properties intermediate between pure rubbers and pure thermoplastic materials at room temperature.

The article by Schollenberger Scott and Moore in "Rubber Chemistry and Technology" Vol.XXXV, No. 3, 1962, pages 742 to 752 at page 743 and in FIG. 3 indicates the long so-called half lives of the polyester urethanes made from adipic acid, 1,4 butane diol and diphenyl methane -p,p' -diisocyanate by the methods disclosed in U.S. Pat. No. 2,871,218 and sold under the Trade Mark ESTANE 5740. These two disclosures are incorporated herein by reference.

Polyurethanes may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate, with a small addition of a difunctional low molecular weight reactant. The last mentioned component may be added either with the other reactants at the start of a one-step polymerisation or at a later stage when it will act primarily as a chain extender.

This type of polyurethane having thermoplastic properties is particularly preferred for use in producing shoe uppers. Particularly preferred polyurethanes are those derived from polyesters by reaction with diols and diisocyanates. As is known from U.S. Pat. No. 2,871,218, mentioned above, many different polyesters, diols and diisocyanates can be used, but a particularly suitable polyurethane system is one in which a polyester made from ethylene glycol and adipic acid is reacted with 1,4-butylene glycol and with 4,4-diphenyl-methane diisocyanate.

In the system in accordance with the above specification the mole ratio of polyester and diol can vary between quite wide limits but the combined mole ratio of polyester and diol is arranged to be essentially equivalent to the mole ratio of diisocyanate so that the resultant polymer is essentially free of unreacted hydroxyl or isocyanate groups.

Polymers of this type but having an improved Shore hardness can be made by using a slight excess of diisocyanate and also by using a copolyester as by replacing part of the ethylene glycol in the above system by 1,4-butylene glycol.

A further alternative polyurethane system which has been found particularly suitable uses polyesters derived from caprolactones. Such polyurethanes are described in British Patent Specification No. 859,640, the disclosure of which is incorporated hereby by reference.

The polymers may be produced by a bulk polymerization process and subsequently dissolved in suitable solvents or may be prepared directly in solution by a solution polymerization process.

Polyurethanes made in solution as described herein are particularly preferred.

An improved form of that type of polyurethane is disclosed in U.S. Pat. application ser. No. 819,337. The disclosure of that specification is incorporated herein by reference.

The polymer can include conventional stabilizers, fillers, processing aids, pigments, dyes, additives and surface active agents for example proofing or wetting agents.

Any material which is essentially insoluble in the solvent for the polymer and is inert to the solvent and the polymer but which is soluble or can be rendered soluble by a liquid which has no deleterious effects on the polymer can be used as the removable filler. However, inorganic salts such as ammonium sulphate and particularly sodium chloride are preferred because of their ready availability and the ease with which they can be converted to a finely divided form. The use of such temporary fillers has the added advantage that the mixture containing such fillers has a substantially higher viscosity than the polymer solution or polymer extended with liquid vehicle and this facilitates the formation of thick layers. Whilst the preferred method of coagulating the polymer is to wash it or immerse it in a liquid non-solvent for example water or water solvent blends for example of up to 40% or more dimethylformamide concentration any other liquid coagulating method can be used which deposits a continuous though water vapour permeable layer. Such other methods include using a liquid non-solvent containing high concentrations of dissolved electrolytes, for example 15% or higher aqueous sodium chloride solution. The removable filler material is preferably microscopic particulate material which preferably can be removed by dissolution or thermal decomposition. In place of or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution at least at the stage when the polymer is coagulated, for example urea, and which can either by dissolved out by treating the coagulated sheet with water or other suitable solvent for the particles which is a non-solvent for the polyurethane or can be otherwise destroyed or removed; examples of such particles are sodium carbonate, oxalic acid, ammonium carbonate, or suitable microballoons. Alternatively the void-forming particulate material may be in the form of dispersed microscopic droplets of a liquid insoluble in the solution of polyurethane or in the form of dispersed microscopic bubbles of gas.

Additionally the pore formation could be controlled by dispersing removable or permanent fibrous fillers such as polyvinyl alcohol fibres or polyamide fibres or by incorporating permanent particulate fillers, such as silica, preferably of very small particle size for example less than 1 micron.

When a removable filler, such as sodium chloride, is used the pore size of the resultant water vapour permeable material depends to some extent on the particle size of the removable filler in the paste and if a microporous material is to be made then none of the filler particles must be larger than 100 microns, and preferably most are substantially smaller, for example less than 50 microns typically in the range 1 to 40 or 3 to 20 microns.

Many solvents are known for organic polymers and any suitable one can be chosen for the particular polymer used and preferably an organic solvent is used. However, for elastomeric polyurethanes, N.N'-dimethylformamide, dimethyl sulphoxide N-methyl pyrrolidone, dimethylacetamide and tetrahydrofuran are particularly useful. Dimethylformamide, dimethyl sulphoxide and the other solvents can be diluted with other cheaper solvents such as toluene and methylethylketone which although not solvents for polyurethanes on their own do not act as non-solvents when mixed with dimethylformamide or the other solvents mentioned above.

If the initial application of the polymer layer to the porous support occurs some distance from the initial coagulation of the free surface of the polymer it may be desirable for additional non solvent to be applied in the intervening period. Preferably non solvent is applied to the free surface of the belt every 2 to 6 feet eg 4 to 5 feet eg every ½ minute to 2 minutes at belt speeds from about 1 foot to 15 feet per minute. However the basic requirement is that the free surface of the porous supports should be kept evenly wetted. Belts which in the free state absorb 15 to 20 eg about 17 grams of water per square foot have been found satisfactory and it is anticipated that belts capable of absorbing wider ranges of water eg 5 or 10 to 30 or 40 grams per square foot could also be satisfactory. The amount of water which is supplied to the keying trough must thus be sufficient to fulfil the requirements of that proportion of the belt which is not filled with polymer composition with a small margin sufficient to coagulate the face of the polymer inside the porous support. Thus with a porous support 4 feet wide moving at 10 feet per minute, capable of absorbing 17 grams per square foot of water in a static condition at 20°C when the trough is positioned at a distance from the extrusion head such as to allow 60% penetration of the porous support by the polymer layer, one is going to need to supply at least 272 grams of non solvent per minute to satisfy the requirement of the support. Thus a workable rate of supply is of the order of 300 or 350 to 500 or 1000 grams per minute. Higher rates of supply can be used to ensure a safety margin but are not essential.

The width of the trough in the machine direction is desirably of the order of 2 to 10 cms overall. However all that is required is for the contact time between the belt and the trough to be sufficient for the belt to be fully wetted. We have found that when this contact time is of the order of 1 to 2 seconds adequate wetting occurs eg an array of three troughs side by side providing a non solvent surface 7.5 cm wide produces adequate wetting at a support speed of 10 feet per minute.

The need to achieve an adequate degree of keying of the layer to the porous support has also been mentioned. Experiments have indicated that with the preferred resin formulations containing dispersed microscopic salt which typically have viscosities of the order of 7500 poise eg in the range 3000 or 5000 to 10,000 to 12,000 poise at 20 °C as measured on a Brookfield RVT viscometer with a No. 7 spindle at 5 r.p.m. a belt which has a filtering effect such as to prevent the passage of particles having diameters above 100 microns but allow passage of particles below 60 microns produces satisfactory results. At values below 60 microns the keying tends to be inadequate and at values above 100 microns the formulations tend to penetrate through the porous support and cause uneven movement of the belt by coagulating in lumps below the belt.

Figure 5:
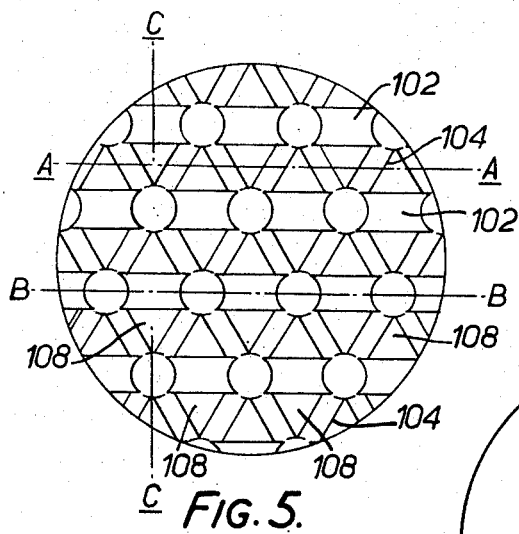

FIGS. 5 to 8 show the belt pattern produced with a satisfactory polymer penetration (about 50–60%) of the 60 weave belt having a plain weave polyester fibre weft and a straight stainless steel warp thread mentioned above. FIG. 5 is a planar view.

Figure 6:
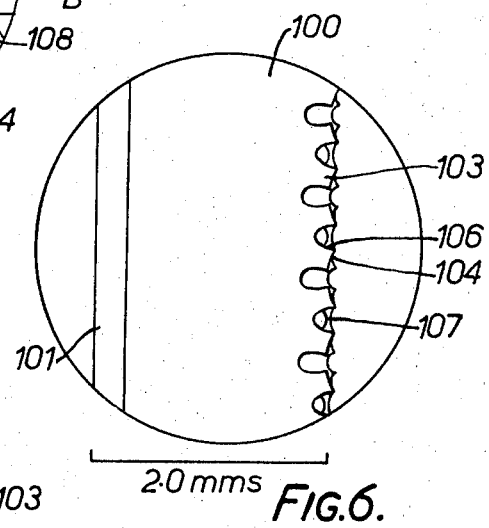
Figure 7:
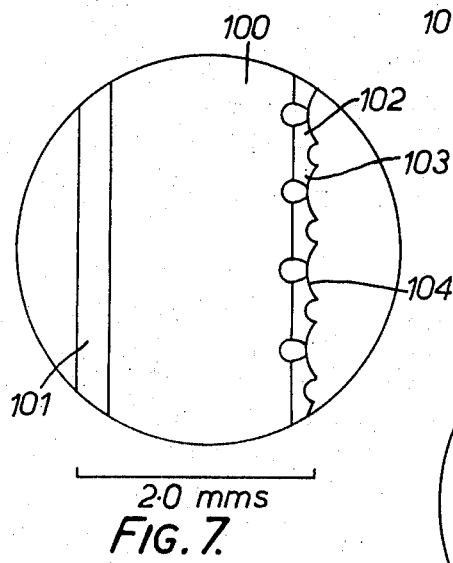
Figure 8:
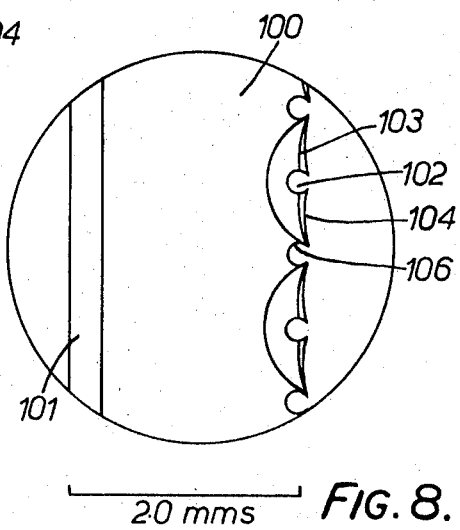

FIG. 6 is a cross section on the line A—A in FIG. 5 i.e. halfway between a pair of warp threads, FIG. 7 is a cross section on the line B—B in FIG. 5 i.e. along a warp thread, and FIG. 8 is a cross section along the line C—C in FIG. 5 i.e. transverse to the warp threads. These views are all prepared from views at the same magnification (scales are given beside FIGS. 6,7, and 8) but are diagrammatic.

The total polymer layer is shown in FIGS. 6, 7 and 8 and is about 2.0 mms thick having a substrate portion 100 and an integral top coat 101.

The belt pattern is about 0.3 mms deep. The belt is symmetrical around the warp threads which occupied the passages 102, five of which can be seen in FIG. 8 and one of which can be seen in FIG. 7.

The fingers, or units 103 of coagulated polymer which penetrated into the gaps between the threads as can be seen from FIGS. 6, 7 and 8 are not circular in cross section. In the various planes of the drawings they have very slightly divergent ends 104 so that the width of these ends in the plane is normally very slightly larger than the narrowest width of the finger e.g. as indicated at 106. However, even with the narrowest fingers as shown in FIG. 6 the ratio as determined by inspection at higher magnification is only of the order 3.8 to 3.2 for the width of the end 104 to the width of the neck 106 in the plane of FIG. 6.

Thus there is a substantial absence of nubs whose free surface length i.e. the surface indicated by 104, in any cross section through the thickness of the material exceeds twice or 1.5 or 1.3 times the narrowest width of the nub or finger in that same plane. These fingers extend up between the warp threads as indicated in FIG. 6 and are linked as indicated at 107 by very thin bridges to adjacent fingers in the same row between adjacent warp threads. The bridges 107 are broken on stripping the layer from the belt. As indicated by FIG. 8 the fingers are longer in the direction transverse to the warp threads than they are in the direction parallel to the warp or thread transverse to the length of the belt. The nubs 104 are the parallelogram shaped areas between the adjacent warp threads. The triangles 108 indicate the cavity caused by a weft thread passing beneath a warp thread as indicated in FIG. 8.

This is the area shown in FIG. 5 which is 0.09 sq.cms. per square cm i.e. about 1800 per square inch.

More broadly it is preferred to have between about 1000 and 3000 e.g. 1500 to 2000 nubs per square inch.

In a modified form of suitable belt the nubs 104 are arranged end to end in straight rows rather than being arranged in diagonal rows. The number of nubs is essentially the same and the fibre sizes and spacings are also very similar. The essential feature is that the mechanical keying by the slightly widened nubs should be such as to resist the shrinkage force of the layer and the various parameters must be balanced to achieve this whilst still allowing the coagulated layer to be stripped from the belt.

The shrinkage forces mentioned above will occur with any coating but only become significant when the polymer layer is of the order of thickness with which we are concerned e.g. 0.5 to 1 mm and above e.g. around 2.0 mms. It has been mentioned above that the belt picks up 15 to 20 grams of water per square foot in a static state. This is measured by cutting out a 6 by 6 inch square of the belt drying it at 120°C for one hour, allowing it to cool to 20°C and then weighing it. It is immersed in water and then removed without shaking and hung freely in a vertical position for 10 seconds to drain. Any excess drips are removed from its bottom edge and the sample is weighed. It has also been mentioned above that the belt is such to retain particles of 100 microns diameter and above whilst allowing particles of 60 microns and below to pass through. This refers to the passage of particles suspended in a liquid. The belt being used as a filter to determine this information.

The invention is not dependent on any particular theory but the freedom from air bubbles and blisters is thought to be due to the fact that the non solvent is applied evenly and regularly across the width of the porous support with a regular, and in the preferred case a straight line of contact, between the belt and the non solvent front in the trough. This combined with the slow steady relative movement is thought to enable the non solvent to wick up into the intersteces of the belt flushing the air out of the intersteces backwards i.e., in the opposite direction to the direction of travel of the belt. Thus it is thought that the leading edge of the non solvent in the belt may become established at the leading edge of the trough or at least in such a position that adequate flushing of the air in the belt can occur.

If desired a small amount of a wetting agent e.g. 0.01 to 0.5 e.g. 0.03% e.g. of a sulphonate type such as TEEPOL (trade mark) may be used in the liquid fed to the keying trough to assist in the wetting process.

What we claim as our invention and desire to secure by Letters Patent is:

1. A process for making water vapour permeable polymer sheet material which comprises forming a layer at least 0.5 mms thick of coagulable film forming polymer composition, comprising polymer and solvent therefor, on a porous solid support, the said layer having a free surface and the said porous support having a free surface, bringing said layer of coagulable film forming polymer composition into contact with a liquid non solvent coagulant for the said polymer while there is continuous relative movement between (a) said support and (b) the point of application of said polymer composition to said support and the point of contact of non solvent coagulant with said composition, said point of application being upstream of said point of contact, the said composition and the said coagulant being such that said contact results in coagulation of the said layer to porous water vapour permeable form, and then stripping the coagulated layer from the support, characterized in that the support is arranged to be dry and evenly porous upstream of said point of application and in that before the polymer has penetrated through the support, non solvent coagulant liquid is evenly applied to the free surface of the porous support across the width of the layer, upstream of said point of contact and downstream of said point of application, the porosity of the support and the amount and moment of application of the coagulant to said free surface of said support being such as to prevent the layer of polymer penetrating through the support.

2. A process as claimed in claim 1 in which the non solvent liquid is applied to the support by maintaining a free non solvent surface at a fixed position extending across the width of the layer, maintaining the free surface of the porous support in contact with the non solvent surface and causing continuous relative movement therebetween.

3. A process as claimed in claim 1 in which the non solvent is applied to the porous support in such a manner that the coagulated polymer penetrates from 30 to 60% through the thickness of the porous support.

4. A process as claimed in claim 1 in which the coagulable film forming polymer composition has a viscosity in the range 3000 to 12000 poise at 20°C as measured by a Brookfield RVT viscometer using a No. 7 spindle at 5 r.p.m. and the porous support in the free state under static conditions at 20°C absorbs 15 to 20 grams of liquid water per square foot and will permit the passage through its thickness of particles below 60 microns in diameter but will prevent the passage of particles above 100 microns in diameter.

5. A process as claimed in claim 1 in which the free surface of the said porous support is led past means for supplying liquid non solvent coagulant in wicking relationship thereto and liquid non solvent is supplied to the said means whereby the free surface of the porous support is evenly wetted with the said non solvent.

6. A process as in claim 5 in which said liquid non solvent is in a body extending across beneath the support and bounded by walls having rounded top edges on which the said free surface of the porous support bears in sliding relationship.

7. A process as in claim 6 in which the ratio of the width of said body in the direction of movement of the porous support to the thickness of the polymer layer is in the range 50/1 to 5/1 and non solvent liquid is fed into said body so as to cause the non solvent to overflow said walls.

8. A process as in claim 6 in which there are a pair of said bodies placed side by side each body having a width in the range 50/1 to 5/1 with regard to the thickness of the polymer layer.

9. A process as claimed in claim 1 in which the coagulation of the said free surface of the polymer layer is initiated by applying said coagulant in continuous form to said free surface by forming a continuous layer of said coagulant liquid extending across the width of the said layer on said surface.

10. A process as claimed in claim 9 in which the sheet is arranged uppermost on the said porous support.

11. A process as claimed in claim 9 which comprises passing the said free surface of the said layer through a surface of said liquid non solvent coagulant which surface of coagulant is stabilized against movement.

12. A process of making a water vapour permeable polymer sheet material which comprises forming a layer at least 0.5 mm thick of a coagulable polymer composition in adherence with a porous solid support, the said layer having a free surface and the said porous support having a free surface, the polymer composition being polymer extended with liquid vehicle selected from the group consisting of emulsions of polymer in blends of solvent and non solvent, colloidal dispersions of polymer in blends of solvent and non solvent, gels of polymer in blends of solvent and non solvent, solutions of polymer in solvent, and solutions of polymer in blends of solvent and non solvent, the solvent being one selected from the group consisting of N,N'-dimethylformamide, dimethyl sulphoxide, N-methyl pyrrolidone, dimethyl acetamide, tetrahydrofuran and blends with toluene and methylethylketone and mixtures thereof, the non solvent being one selected from the group consisting of water, glycol monoethyl ether, ethylene glycol, glycerol, 1,1,1-trimethylol propane, methanol, ehtanol, acetone, hexane, octane, benzene, petroleum naphtha, toluene, tetrachloroethylene and chloroform, and the polymer being one selected from the group consisting of polyvinylchloride, vinyl chloride copolymers, acrylonitrile, acrylonitrile copolymers, polyurethanes, copolymers of butadiene and acrylonitrile, polyacetals, polyamides, polyesteramides, polyvinylidene chloride, polymers of alkyl esters of acrylic and methacrylic acids, chlorosulphonated polyethylene, cellulose esters and ethers, polystyrene and blends thereof, the support being arranged to be dry and evenly porous prior to application of the layer of polymer and in that before the polymer has penetrated through the support, and before the layer is brought into contact with the coagulant, non solvent coagulant liquid is evenly applied to the free surface of the porous support across the width of the layer, the porosity of the support and the amount and moment of application of the coagulant being such as to prevent the layer of polymer penetrating through the support, and thereafter causing continuous relative movement of the said layer in adherence with the support with respect to a body of non solvent coagulating liquid, selected from the group consisting of water, glycol monoethyl ether, ethylene glycol, glycerol, 1,1,1-trimethylol propane, methanol, ethanol, acetone, hexane, octane, benzene, petroleum naphtha, toluene, tetrachloroethylene, and chloroform the free surface of the said layer coming into contact with the said body of coagulating liquid along a line of contact bounding an exposed surface of the said body of liquid, the said liquid surface being stabilized along a line spaced from the said free surface of the said layer by not more than 1 centimeter, whereby at least the said free surface of the layer is coagulated to water vapour permeable form of improved surface smoothness.

13. A method as claimed in claim 12 in which the said liquid surface is stabilized by the presence of a solid boundary located along the said spaced line, the separation of the said boundary from the said free surface of the layer being such that a meniscus of non solvent liquid is formed therebetween.

14. A method of making a water vapour permeable polymer sheet material as claimed in claim 9 which comprises forming an initial mixture comprising elastomeric thermoplastic polyurethane dissolved in dimethylformamide with microscopic water soluble inorganic salt particles dispersed through the mixture, forming a layer at least 0.5 mm thick of the initial mixture in adherence with a support, passing the layer in adherence with the support past a plate spaced from the free surface of the said layer a distance such that on supplying an aqueous non solvent liquid to the gap between the plate and the layer a meniscus is formed at the upstream end of the gap and supplying the said aqueous non solvent for the polymer to the said gap so as to establish and maintain the said meniscus of non solvent at the upstream end of the gap.

15. A process of making a water vapour permeable polymer sheet material as claimed in claim 9 which comprises forming a layer at least 0.5 mm thick of a polymer composition in adherence with a porous support, the said polymer composition being one which is coagulable to a water vapour permeable self supporting form by immersion in liquid non solvent for the polymer, and causing continuous relative movement of the layer in adherence with the support with respect to a body of coagulating liquid which is a non solvent for the polymer, characterized in that the free surface of the said layer comes into contact with the said body of coagulating liquid along a line of contact bounding an exposed surface of the said body of liquid, the said liquid surface being stabilized along a line spaced from the said free surface of the said layer by not more than 1 centimeter, whereby a continuous layer of non solvent liquid not more than 1 centimeter thick is established across the said free surface of the layer of polymer at the said line of contact and at least the said free surface is thereby coagulated to water vapour permeable form of improved surface smoothness.

16. A process as claimed in claim 9 characterized in that the speed of the said free surface of the polymer layer with respect to the said line of contact with the said body of coagulating liquid is less than 15 feet per minute, and the said layer of polymer is maintained on the support until the layer is coagulated to self supporting form.

17. A process for making water vapour permeable polymer sheet material which comprises forming a layer at least 0.5 mm thick of coagulable film forming polymer composition, comprising polymer and solvent therefor, on a continuously moving endless porous solid support, the said layer having a free surface and the said porous support having a free surface, bringing said layer of coagulable film forming polymer composition on said support into contact with a liquid non solvent coagulant for the said polymer, said composition and said coagulant being such that said contact results in coagulation of the said layer to porous water vapor permeable form, then striping the coagulated layer from the support and repeating said steps on the support from which said layer has been stripped, characterized in that said liquid coagulant is removed from said support prior to the application of said polymer composition thereto, and in that before the polymer has penetrated through the support and prior to the contact of non solvent with the free surface of the polymer composition, non solvent coagulant liquid is applied to the free surface of the porous support, the porosity of the support and the amount and moment of application of the coagulant to said free surface of said support being such as to prevent the layer of polymer penetrating through the support.

18. Process as in claim 17 in which said support is a woven fabric and the coagulant is applied to said free surface of said support in such manner that the layer of polymer penetrates 30 to 60% through the thickness of said support.

19. Process as in claim 18 in which said support is cleaned and dried in its passage from the point where said layer is stripped therefrom and the point where said layer is applied thereto so that said layer is applied to a clean dry support.

* * * * *